United States Patent [19]

Martin et al.

[11] 4,228,050

[45] Oct. 14, 1980

[54] CONDUCTIVE MOLDING COMPOSITION

[75] Inventors: Carl J. Martin; Marvin J. Voelker, both of Indianapolis; Robert J. Ryan, Zionsville, all of Ind.

[73] Assignee: RCA Corporation, New York, N.Y.

[21] Appl. No.: 3,363

[22] Filed: Jan. 15, 1979

[51] Int. Cl.$^3$ .................. C08L 91/00; H04N 5/76; H04N 5/82

[52] U.S. Cl. ................... 260/23 XA; 260/23 EP; 260/42.49; 260/998.16; 274/41 A; 358/128.5; 358/129

[58] Field of Search ........ 260/23 XA, 998.16, 23 EP, 260/42.49; 358/128, 129; 274/41 A

[56] References Cited

U.S. PATENT DOCUMENTS

| | | | |
|---|---|---|---|
| 3,770,667 | 11/1973 | Tucker | 260/22 CB |
| 3,833,408 | 9/1974 | Matthies | 252/28 |
| 3,842,194 | 10/1974 | Clemens | 178/6.6 A |
| 3,960,790 | 6/1976 | Khanna | 260/23 XA |
| 3,975,321 | 8/1976 | Heiberger | 260/18 PF |
| 4,129,536 | 12/1978 | Martin et al. | 260/23 XA |
| 4,151,132 | 4/1979 | Khanna | 260/23 XA |

*Primary Examiner*—Ronald W. Griffin
*Attorney, Agent, or Firm*—Birgit E. Morris

[57] ABSTRACT

An improved molding composition having a bulk resistivity below about 500 ohm-cm at 900 megahertz for compression molding video discs comprising sufficient conductive carbon black particles to obtain the desired conductivity, from about 1.5 to 4 percent by weight of stabilizers, from about 1 to 3 percent by weight of at least two lubricants, up to 10 percent by weight of plasticizers and processing aids, the remainder being a polyvinylchloride based resin, with the proviso that not more than about 5 percent by weight of liquid additives are present in said molding composition. Video discs molded from said composition have improved dimensional stability.

9 Claims, 2 Drawing Figures

CONDUCTIVE MOLDING COMPOSITION

This invention relates to an improved molding composition. More particularly, this invention relates to a conductive molding composition from which molded articles of improved dimensional stability can be made.

BACKGROUND OF THE INVENTION

Information records containing video, audio and color information in the form of a very fine surface relief pattern in a plastic disc are known. The surface relief pattern is monitored by a playback stylus and the surface variations are reconstituted in electrical signal form and converted back to information suitable for display by a television receiver.

In a system described by Clemens in U.S. Pat. No. 3,842,194, incorporated herein by reference, a capacitance system is employed whereby the disc and the playback stylus are electrically conducting and a dielectric layer is between them. Initially a plastic disc was coated with a thin metal layer and then a thin dielectric layer. The need to provide two layers produced a system that was cumbersome and expensive and led to a search for a conductive molding composition from which a conductive molded disc could be made.

Fox et al in copending application, Ser. No. 818,279 filed July 25, 1977, have described conductive video disc replicas made by molding a plastic molding composition containing sufficient finely divided conductive particles so that the material has a bulk resistivity below about 500, and preferably below 100 ohm-cm at 900 megahertz. They disclosed that conductive compression molded video discs could be made using a polyvinylchloride homopolymer of copolymer resin containing stabilizers, lubricants and processing aids and conductive particles having a low bulk density in an amount sufficient to produce the required conductivity.

The original molding compositions made by Fox et al were stiff and difficult to process and thus a search was undertaken to improve the processing of the molding composition. In an application filed by Khanna, Ser. No. 818,716, also filed July 25, 1977, now U.S. Pat. No. 4,151,132 a conductive molding composition is described that has improved processability and produces video discs which are less brittle and display reduced bleed out of additives or staining. The latter is undesirable because it changes the surface characteristics of the video discs, producing a high noise level. Khanna's solution was to mix small amounts of a large number of additives, including lubricants, stabilizers and processing aids, into a mixture of vinylchloride resins. Accordingly, Khanna's composition contained about 12-20 percent by weight of conductive carbon black, about 10 percent by weight of a vinyl chloride-vinyl acetate copolymer, about 10 percent by weight of a vinyl chloride-maleate ester copolymer, about 15-17 percent by weight of four or more processing aids and plasticizers, about 3.5 percent by weight of at least two metal stabilizers, about 1.5 percent by weight of at least two lubricants, the balance being a vinyl chloride-propylene copolymer.

The molding compositions of Khanna are readily processable and moldable to form video discs of excellent playback characteristics but they are unsatisfactory from the standpoint of high temperature storage. These compositions have a comparatively low heat distortion temperature which results in permanent deformation or warpage and shrinkage of the discs when stored at temperatures above about 100° F. (37.8° C.).

According to present requirements, a conductive molding composition for the video disc application must be able to provide a flat, rigid disc with excellent replication of minute video information which is dimensionally stable on storage at temperature up to 130° F. (54.4° C.). The present standard for the video disc requires that it have a vertical distortion or warp over the entire surface of a 12 inch (30.5 cm) disc of 0.02 inch (0.05 cm) or less when stored at 130° F. for up to 48 hours, and a lateral shrinkage of no more than 0.05 inch (0.13 cm). Khanna's compositions have been unable to meet these requirements.

Thus a search has continued to obtain conductive molding compositions which have good processability and thermal stability during compound processing and molding; good replication of submicron size surface relief patterns; and dimensional stability on storage under various environmental conditions up to 130° F. (54.4° C.).

SUMMARY OF THE INVENTION

We have found a molding composition having a bulk resistivity below about 500 ohm-cm at 900 megahertz which is readily processable, has a high heat distortion temperature and can produce video disc replicas having improved dimensional stability at 130° F. (54.4° C.) and improved homogeneity and surface characteristics. This molding composition comprises a PVC-based resin containing sufficient finely divided conductive carbon black particles to obtain the desired conductivity; from about 1.5–4 percent by weight of stabilizers; from about 1–3 percent by weight of at least two lubricants; and up to about 10 percent by weight of additional modifiers, with the proviso that not more than about 5 percent by weight of liquid additives are present. Video disc replicas molded from the above composition have improved resistance to the effects of changes in environmental temperatures and humidity as well.

DETAILED DESCRIPTION OF THE INVENTION

Figure 1:
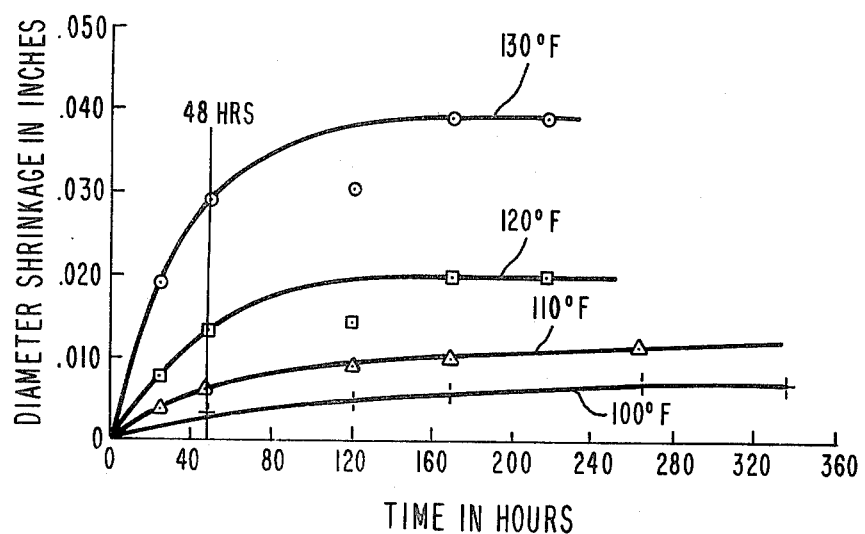
FIG. 1 is a graph showing disc shrinkage at various temperatures versus time for discs made from a molding composition of the invention.

Because of the uniqueness and very small dimensions of information of the video disc, a composition suitable for molding such discs must have a uniform dispersion of the conductive particles and the other additives in a PVC-based resin so that the molded article will have a uniform surface free of defects, minimum shrinkage and warp characteristics and a high heat distortion temperature. The composition must be readily processable to form a very small relief pattern over the surface of a 12 inch disc; and sufficient additives must be added to overcome the stiffness and brittleness imparted by the large quantity of conductive particles present. However, if too large a quantity of total additives are present, the additives bleed to the surface causing non-uniformities and staining, which adversely affects the disc quality and may even render the disc unplayable by filling up the tiny groove or information track monitored by the stylus. In addition, the disc must be insensitive to changes in temperature and humidity that may be encountered during storage and shipping.

The polyvinylchloride (PVC) resins suitable for use herein include polymers and copolymers of vinyl chloride and mixtures thereof. In order to produce the desired characteristics in the molded articles, the PVC resin should have a high heat distortion temperature, preferably 140° F. (60° C.)) or higher for the unfilled resin. Suitable polymers include homopolymers of vinyl chloride such as a vinyl chloride resin available from B. F. Goodrich Company which has a weight average molecular weight of 84,400, a number average molecular weight of 38,140 and a $T_g$ of 88° C.; or a vinyl chloride-polypropylene copolymer commercially available as AP480 from Air Products & Chemicals Inc. which has a $T_g$ of 76° C. Other polyvinylchloride homopolymers such as Great American Chemical Co.'s 550 resin and Air Products' 2160 resin can also be employed.

Conductive particles suitable for use in the molding composition of the invention include highly electrically conductive, finely divided carbon blacks, preferably which have a low bulk density to reduce loading requirements. Presently preferred is a product of the Armak Company, Ketjenblack EC, which has an apparent bulk density of 150 grams per liter and an average particle size of about 300 angstroms. These carbon black particles have a high surface area and a high proportion of voids within the particles, as measured by dibutylphthalate absorption, which enables current to flow between the conductive particles in a non-conductive polymer matrix in a highly efficient manner. Other carbon blacks can also be employed, in whole or in part, provided they meet the electrical requirements. Denser particles of carbon will usually require higher loading, e.g., up to about 35-40 percent by weight, for an equivalent electrical conductivity. The particle size of such conductive carbon particles is not critical but in general the particle size should be less than 500 angstroms to prevent the formation of a grainy surface in the plastic matrix. An amount of from about 12-20 percent by weight of a carbon black such as Ketjenblack EC is preferred.

From about 1.5 to 4 percent by weight of stabilizers are added to the chosen PVC composition. Suitable stabilizers include organo tin compounds such as dibutyltin-$\beta$-mercaptopropionate, dibutyltin maleate and the like and other metallic compounds derived from metals such as lead, zinc, barium and cadmium stearates. Epoxides, phosphites and alkylated phenols such as t-butylcatechol can also be employed. The presently preferred stabilizer system comprises two tin salts, dibutyltin-$\beta$-mercaptopropionate, commercially available as T-35 from M & T Chemical Company, Inc. and dibutyltin maleate, commercially available as Mark 275 from Argus Chemical Company and optionally additional stabilizers such as barium-cadmium-lead stearate. Stabilizers act primarily to neutralize volatiles formed as decomposition products of the polyvinylchloride resins, particularly hydrogen chloride. However, if too much stabilizer is added it will not be absorbed by the resin and thus it is preferred to employ more than one stabilizer in a particular molding composition.

Suitable lubricants for PVC resins are also well known and include fatty acids and esters of alcohols and fatty acids, polyfunctional acid and alcohol esters, soaps such as zinc, lead or calcium stearate and the like, fatty acid amides such as stearic amide, oleamide, ethylene bis stearamide and the like. At least two lubricants should be employed, again, to prevent bleed out of the lubricant during the molding process. The presently preferred combination is a mixture of a monofatty acid ester of varying molecular weight alcohols and acids commercially available as Loxiol G-30 from Henkel International GmbH and Loxiol G-70, a polyfunctional complex ester of saturated fatty acids. Additional lubricants such as calcium stearate can also be added. Sufficient lubricants must be added to prevent high shear heating during processing and to provide good release of the molded disc or other article from the mold. Generally from about 1 to 3 percent by weight of the molding composition of lubricants will be used.

Additional modifiers including plasticizers and processing aids in amounts up to 10 percent by weight of the resin composition can also be added. The addition of primary plasticizers lowers the $T_g$ of the resin composition and the heat distortion temperature. These materials are compatible with polyvinylchloride resins. Liquid primary plasticizers have the greatest effect on the $T_g$ and heat distortion temperature.

The total amount of liquid modifier must be carefully controlled. Liquid modifiers must be compatible with the vinylchloride resin so that they will not bleed to the surface. Solid modifiers can be compatible or incompatible. Compatible modifiers have a much greater effect on the shrinkage and heat distortion temperature of the resin composition, whereas incompatible modifiers act more like fillers and have much less effect on these properties. A certain amount of compatible modifiers must be present for processability and to overcome the stiffening effect of the large amounts of conductive carbon particles in the resin; however, if too much liquid is added, i.e., more than about 5 percent by weight of the resin composition, the $T_g$ and heat distortion temperature of the molding composition are reduced and the warpage and shrinkage characteristics of the molded article will be undesirably high.

By liquid modifier is meant a material that is liquid at room temperature. However, solid, low melting primary plasticizers may also behave as liquids during mixing temperatures and then they are also considered to be included as liquid modifiers.

Thus the present molding compositions have lower amounts of modifiers, i.e., plasticizers and processing aids, than do the compositions of Khanna referred to above.

The total additive level in the molding composition is reduced, as is the amount of low $T_g$ resins such as vinyl chloride-vinyl acetate copolymers, resulting in molded articles having improved dimensional stability.

A presently preferred molding composition for use in making conductive video discs comprises from 12-20 percent by weight of the molding composition of Ketjenblack EC conductive carbon particles, from 1.0-3.0 percent by weight of dibutyltin-$\beta$-mercaptopropionate stabilizer, up to 2.0 percent by weight of a tin maleate stabilizer; from 0.25 to 1.5 percent by weight of Loxiol G-30 lubricant; from 0.15 to 0.75 percent by weight of Loxiol G-70 lubricant; up to 1 percent by weight of calcium stearate lubricant; up to 5 percent by weight of acrylic processing aids; a maximum of about 4 percent by weight of liquid additives and no more than 10 percent by weight of solid additives, the remainder of the composition being a polyvinylchloride homopolymer or vinyl chloride-polypropylene copolymer having a $T_g$ of over about 60° C.

The present molding composition can be prepared by mixing all of the solid ingredients first in a blender such as a Henschel mixer until the temperature reaches about 120° F. (49° C.) and then adding the liquid ingredients, which coat the solid particles. Mixing is continued until the temperature reaches at least about 160° F. (71° C.). The composition is then collected and charged to a Banbury mixer or other suitable apparatus to melt the ingredients under shear. The composition is mixed until it is molten, e.g., to about 350°–380° F. (176°–190° C.), and may be sheeted on a two-roll mill and pelletized for storage. Molded articles, particularly video discs, can be made by compression molding in conventional manner, e.g., forming a preform, compression molding using a 30–60 second cycle at about 325°–380° F. (163°–190° C.) and removing the flashing.

For the present application a thin dielectric layer must be present at the surface of the disc. This dielectric layer can be provided by the presence of a thin film of the molding composition around each conductive particle, or by adding sufficient lubricant to the molding composition so that a small amount bleeds to the surface forming a thin film thereon. Alternatively, a thin lubricant film can also be applied as a separate layer to the disc. This film serves as an added dielectric layer and also serves to reduce stylus wear during playback. One lubricant type that has been employed successfully is a methyl alkyl siloxane of the formula

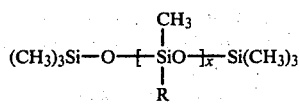

wherein R is an alkyl group of 4–20 carbon atoms and x is an integer. These lubricants can be applied by spinning from solution or evaporated onto the disc surface.

The invention will be further illustrated by the following Examples, but it is to be understood that the invention is not meant to be limited to the details described herein. In the Examples parts and percentages are by weight.

EXAMPLE 1

A molding composition was prepared by mixing the following ingredients in a Henschel mixer: 74.05 parts of a vinylchloride-polypropylene copolymer, AP-480; 15 parts of Ketjenblack EC carbon particles; 0.5 part of Loxiol G-30 lubricant; 0.25 part of Loxiol G-70 lubricant; 0.3 part of calcium stearate lubricant; 2 parts of Acryloid K-175, a commercially available processing aid of Rohm and Haas Company; 1.5 parts of T-35 stabilizer; 1.0 part of dibutyltin maleate stabilizer Mark 275, a liquid; 1.0 part of barium-lead stearate stabilizer, commercially available as Mark Q232B, also from Argus Chemical Company; 1.0 part of an epoxidized soybean oil, Paraplex G-62, a plasticizer commercially available from Rohm and Haas Company, a liquid; 0.4 part of Wax E, an esterified montan wax lubricant, commercially available from the Hoechst Company; 1.0 part of glyceryl tribenzoate, commercially available as Benzoflex S404 from Velsicol Chemical Corporation, a solid plasticizer; and 2.0 parts of a chlorinated paraffin wax, commercially available as Unichlor 70AX from Neville Chemical Company, a solid modifier.

Mixing was continued until the temperature reached about 190° F. (87.8° C.). The mixture was cooled and fed to a plasticating extruder to form a pelletized compound. Video discs 12 inches in diameter were compression molded from the pellets at 350° F. (176.7° C.) using a 36 second cycle with a metal stamper described by Clemens in U.S. Pat. No. 3,842,194, referred to herein above.

The discs were tested for shrinkage by putting on a center spindle and placing in an oven at varying temperatures from about 100°–130° F. (37.8°–54.4° C.) for various periods. The diameter of the discs was measured before and after the heat treatment. The data are summarized in FIG. 1 which shows that shrinkage increases with increasing temperature, and that the discs' shrinkage stabilizes after about 120 hours. All of the discs tested had a shrinkage less than 0.05 inch.

In comparison, discs made from the molding composition described by Khanna in Example 1 of his copending application referred to above, when heated for 24 hours at 130° F., had a shrinkage of from 0.0965 to 0.1055 inch (0.25–0.27 cm) over a 12 inch disc.

EXAMPLE 2

Figure 2:
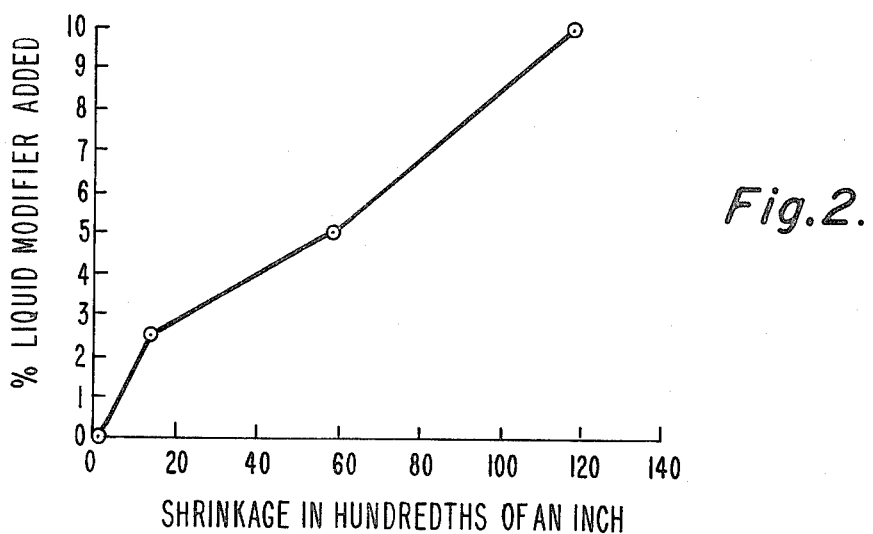
FIG. 2 is a graph showing the shrinkage effect versus time due to the addition of a liquid modifier to a molding composition of the invention.

Several runs were made using the composition of Example 1 but adding increasing amounts of a liquid phthalate modifier commercially available as Santicizer 711 from Monsanto Corporation. The discs were tested for shrinkage at 130° F. for 24 hours. Shrinkage greatly increased with increasing amount of liquid additive, as shown in FIG. 2.

EXAMPLE 3

A molding composition similar to Example 1 was prepared except substituting GAC 550 polyvinylchloride homopolymer for the polyvinylchloride-polypropylene copolymer of Example 1.

Video discs made from this composition and tested as in Example 1 had a shrinkage of 0.024 inch (0.06 cm).

EXAMPLE 4

A molding composition similar to Example 1 was prepared except substituting B. F. Goodrich's polyvinylchloride homopolymer having a $T_g$ of 88° C. referred to above as the resin.

Video discs made from this composition and tested as in Example 1 had a shrinkage of 0.012 inch (0.03 cm).

EXAMPLE 5

A molding composition was prepared containing 76.5 percent of Goodrich PVC homopolymer of Example 4, 15.0 percent of Ketjenblack EC, 0.75 percent of Loxiol G-30 lubricant, 0.25 percent of Loxiol G-70 lubricant, 0.5 percent of calcium stearate lubricant, 2.0 percent of dibutyltin-β-mercaptopropionate stabilizer, 1.0 percent of Mark 275 tin maleate stabilizer, and 3.0 percent of Santicizer 711, a primary phthalate liquid plasticizer and 2.0 percent of Acryloid K-147, a solid acrylic modifier available from Rohm and Haas Company.

Video discs made from this composition and tested as in Example 1 had a shrinkage of 0.022 inch (0.06 cm).

CONTROL A

A molding composition similar to Example 1 was prepared except omitting the tin maleate stabilizer, using 0.75 part of G-30 and 1.0 part of calcium stearate lubricants, omitting the epoxidized soybean oil and substituting 2.0 parts of Kodalfex NP-10, a polymeric ester liquid plasticizer, and adding 3.0 parts of dicyclohexyl phthalate, a solid primary plasticizer which acts as a liquid at processing temperatures. Thus this composition has an effective liquid content of 6.0 percent.

Video discs made from this composition and tested as in Example 1 had a shrinkage of 0.74 inch (0.19 cm).

CONTROL B

A molding composition was prepared as in Example 1 using the PVC resins of Example 3, 15 parts of Ketjenblack EC carbon particles, 0.5 part of G-30, 0.25 part Loxiol G-70, 1 part of calcium stearate, 2 parts of T-35 stabilizer, 2 parts of K-175 and 7 parts of liquid plasticizer Kodaflex NP-10. Thus this composition had a liquid content of 7 percent.

Video discs made form this composition and tested as in Example 1 had a shrinkage of 0.0705 inch (0.18 cm).

We claim:

1. A conductive molding composition comprising sufficient finely divided conductive carbon black particles so that the composition has a bulk resistivity below 500 ohm-cm at 900 megahertz,
from about 1.5 to 4 percent by weight of stabilizers for polyvinylchloride resins:
from about 1 to 3 percent by weight of at least two lubricants for polyvinylchloride resins;
up to 10 percent by weight of plasticizers and processing aids for polyvinylchloride resins, and the remainder a polyvinylchloride-based resin, having a $T_g$ of at least 60° C., with the proviso that not more than about 5 percent by weight of liquid additives that are compatible with the polyvinylchloride resin are present and wherein the carbon black, stabilizers, lubricants, plasticizer and processing aids are uniformly dispersed with the resin.

2. A composition according to claim 1 wherein said carbon black has an apparent bulk density of about 150 grams per liter.

3. A composition according to claim 2 wherein from about 12 to 20 percent by weight of said carbon black is present.

4. A composition according to claim 1 wherein said bulk resistivity is below 100 ohm-cm at 900 megahertz.

5. A composition according to claim 1 wherein said polyvinylchloride-based resin is a homopolymer of vinyl chloride having a heat distortion temperature of at least 60° C.

6. In a information record, adapted for use with a playback stylus to effect recovery of signals occupying a bandwidth of at least several megahertz when relative motion at a desired rate is established between said record and said stylus, said record comprising a disc of a plastic material containing finely divided conductive particles and having a bulk resistivity below about 500 ohm-cm at 900 megahertz, said record havig an information track in a surface, said information track constituted by a surface relief pattern of such dimension to accommodate recovery of signals of said bandwidth upon establishment of said motion at said rate, the improvement comprising employing as said molding composition a conductive molding composition comprising conductive carbon black particles; from about 1.5 to 4 percent by weight of stabilizers for polyvinylchloride resins; from about 1 to 3 percent by weight of at least two lubricants for polyvinylchloride resins; up to 10 percent by weight of plasticizers and processing aids for polyvinylchloride resins and the remainder a polyvinylchloride-based resin having a $T_g$ of at least 60° C., with the proviso that not more than about 5 percent by weight of liquid additives that are compatible with the resin are present and wherein the carbon black, stabilizers, lubricants, plasticizer and processing aids are uniformly dispersed with the resin.

7. An information record according to claim 6 wherein said carbon black has an apparent bulk density of about 150 grams per liter.

8. A video information record according to claim 6 wherein said bulk resistivity is below 100 ohm-cm at 900 megahertz.

9. An information record according to claim 6 wherein said information track is a spiral groove dimensioned for reception therein of said playback stylus.

* * * * *